United States Patent

Watson et al.

[11] Patent Number: 5,841,018
[45] Date of Patent: Nov. 24, 1998

[54] METHOD OF COMPENSATING FOR INSTALLATION ORIENTATION OF AN ATTITUDE DETERMINING DEVICE ONBOARD A CRAFT

[75] Inventors: Gary Stewart Watson, Ada; Krishna Devarasetty, Kentwood, both of Mich.

[73] Assignee: B. F. Goodrich Avionics Systems, Inc., Akron, Ohio

[21] Appl. No.: 785,553

[22] Filed: Dec. 13, 1996

[51] Int. Cl.$^6$ .............. G01C 17/38; G01C 21/00
[52] U.S. Cl. ............... 73/1.81; 73/178 R; 244/164
[58] Field of Search ............... 73/1.79, 1.81, 73/1.78, 1.75, 1.76, 1.77, 178 R; 244/164, 171

[56] References Cited

U.S. PATENT DOCUMENTS

| | | | |
|---|---|---|---|
| 3,881,258 | 5/1975 | Iddings | 324/247 |
| 4,212,443 | 7/1980 | Duncan et al. | 244/177 |
| 4,318,300 | 3/1982 | Maughmer . | |
| 4,777,818 | 10/1988 | McMurtry | 73/1.79 |
| 4,982,504 | 1/1991 | Söderberg et al. | 73/1.79 |
| 5,313,410 | 5/1994 | Watts | 73/1.79 |
| 5,543,804 | 8/1996 | Buchler et al. | 342/357 |
| 5,562,266 | 10/1996 | Achkar et al. | 73/1.79 |
| 5,612,687 | 3/1997 | Cescon et al. . | |

FOREIGN PATENT DOCUMENTS

| | | |
|---|---|---|
| 0 744 590 A2 | 11/1996 | European Pat. Off. . |
| 1 574 270 | 9/1980 | United Kingdom . |
| WO 87/01349 | 3/1987 | WIPO . |

*Primary Examiner*—Max H. Noori
*Attorney, Agent, or Firm*—William E. Zitelli

[57] ABSTRACT

In accordance with the disclosed method, an attitude determining device which is installed onboard a mobile craft, like an aircraft, for example, at an unknown orientation with respect to the reference coordinate system of the craft senses its installation orientation with respect to an earth frame coordinate system when the craft is at rest to obtain a static orientation measurement thereof. Thereafter, an attitude of the mobile craft with respect to the earth frame is measured with the attitude determining device and such measurement is compensated with the static orientation measurement to obtain attitude information of the craft's reference coordinate system with respect to the earth frame coordinate system. The installation orientation of the attitude determining device may be sensed while the craft is at rest in either a leveled or unleveled condition.

20 Claims, 4 Drawing Sheets

METHOD OF COMPENSATING FOR INSTALLATION ORIENTATION OF AN ATTITUDE DETERMINING DEVICE ONBOARD A CRAFT

BACKGROUND OF THE INVENTION

The present invention relates to attitude determining devices onboard a mobile craft for determining the attitude of the craft's reference coordinate system with respect to an earth frame of reference, and more specifically, to a method of compensating an attitude measurement of such device for an unknown installation orientation with respect to the reference coordinate system of the craft.

Attitude determining devices for mobile craft, like aircraft, for example, measure the attitude of the moving craft with respect to an outside reference coordinate system, typically known as earth frame. The devices may be installed at a location in the craft in such a manner to be mechanically aligned with the reference coordinate system of the craft. The reference coordinate system of conventional aircraft comprises three orthogonal axes which include a longitudinal or X axis, a lateral or Y axis, and a vertical or Z axis. Motion of the aircraft is generally described as roll which is a rotation about the X axis, pitch which is a rotation about the Y axis and yaw which is a rotation about the Z axis. Pitch, roll and yaw positions are measured as the current angle between the aircraft reference coordinate system and earth frame. Conventionally, aircraft attitude determining devices primarily measure attitude of the aircraft in pitch and roll.

Any inaccuracy in installing an attitude determining device in the craft with respect to the reference coordinate system thereof will result in inaccurate measurement and presentation of the attitude of the craft to either the pilot or other system using the attitude information for display or control purposes. Currently, a method of installing these devices in an aircraft has been to accurately level the aircraft first, and then, install the device using shims or other mechanical apparatus to correctly position the device with respect to the three orthogonal axes forming the coordinate system of the aircraft. This procedure of leveling is adequate for devices mounted in locations of the aircraft remote from the cockpit, but when the device is to be mounted in a cockpit location, such as on an instrument panel, for example, shimming or other mechanical means of adjusting the installation orientation thereof may be precluded due to viewing angle restrictions, aesthetics, . . . etc. Accordingly, some other compensation method will be required.

Currently, units installed on an instrument panel in the cockpit of an aircraft have slots for roll axis alignment and internal mechanical means to accommodate pitch angles other than zero. However, these accommodations for pitch angles make the assumption of zero error in manufacturing tolerances of the aircraft panel angle.

Accordingly, the inventive method described herein below ensures a substantially accurate measurement of aircraft attitude by the attitude determining device with respect to the earth frame of reference. The static installation orientation is automatically determined by the device itself and the attitude measurement is compensated therewith in a processor of the device. Thus, the drawbacks of the current mechanical leveling and alignment procedures are avoided.

SUMMARY OF THE INVENTION

In accordance with the present invention, an attitude determining device which is installed onboard a mobile craft at an unknown orientation with respect to the reference coordinate system of the craft senses its installation orientation with respect to an earth frame coordinate system when the craft is at rest to obtain a static orientation measurement. An attitude of the mobile craft is measured with the attitude determining device and such measurement is compensated with the static orientation measurement to obtain attitude information of the craft's reference coordinate system with respect to the earth frame coordinate system.

In one embodiment, the acceleration of the attitude determining device is sensed for each of the axes of the reference coordinate system of the mobile craft while at rest and leveled, and a static attitude pitch and static attitude roll of the device are determined from trigonometric functions of ratios of the sensed accelerations. Accordingly, both of the measured attitude pitch and roll of the device are compensated with the static attitude pitch and the static attitude roll, respectively, in the attitude determining device to render attitude information of the craft's reference coordinate system with respect to the earth frame coordinate system.

In another embodiment, a static attitude of the mobile craft in pitch and roll is obtained while the craft is at rest and unleveled. Thereafter, the static attitude craft pitch is used in determining the static attitude pitch of the device and the static attitude craft roll is used in determining the static attitude roll of the device and such static attitude pitch and roll are used respectively to compensate for the measured attitude pitch and roll of the mobile craft in the attitude determining device.

DESCRIPTION OF THE PREFERRED EMBODIMENT

Figure 1:
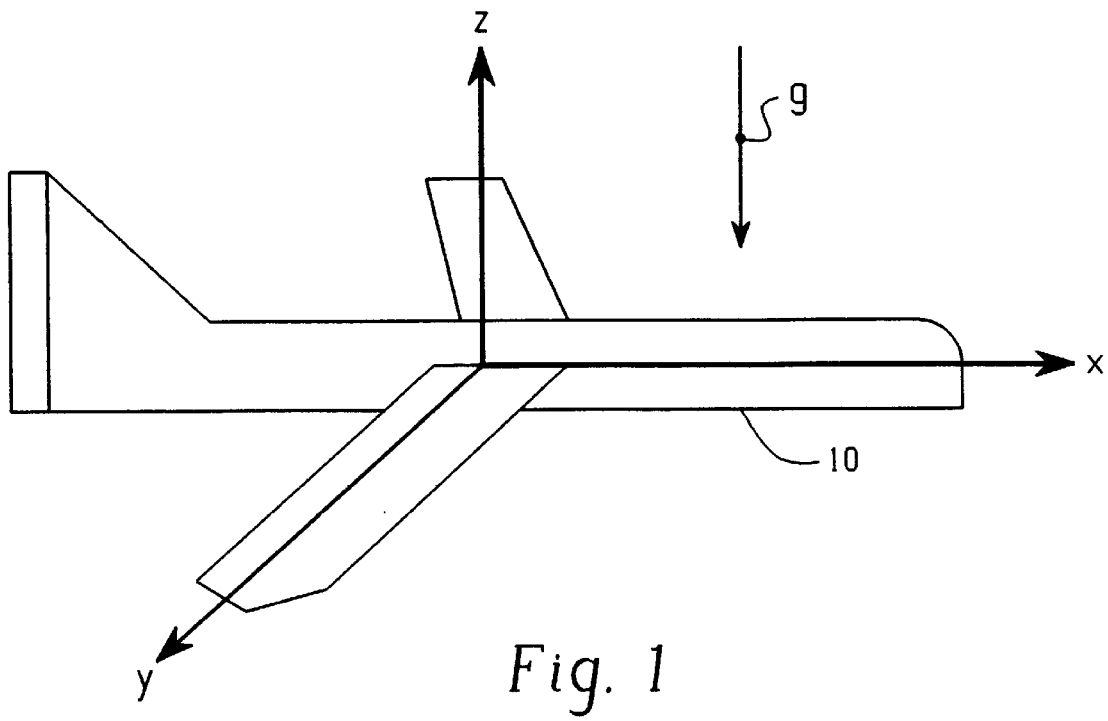
FIG. 1 is an illustration of an aircraft, with it's reference coordinate system, onboard which an attitude determining device may be installed.

For the present embodiment, an aircraft will be used, by way of example, as a mobile craft, but it is understood that other similar craft may be used where ever an attitude of the craft is desired and measured with respect to an earth frame of reference coordinate system, hereinafter referred to simply as earth frame. An aircraft with its reference coordinate system is shown in FIG. 1 including a longitudinal axis depicted as an X axis, a lateral axis depicted as a Y axis, and a vertical axis depicted as a Z axis. Accordingly, roll of the aircraft may be measured as the angular rotation about the X axis, pitch of the aircraft may be measured by the angular rotation about the Y axis and yaw of the aircraft may be measured by the angular rotation about the vertical Z axis. All of these angles are measured with respect to the earth frame. Conventionally, an attitude determining device of an aircraft measures attitude in pitch and roll.

To accurately level the aircraft 10 such that its reference coordinate axes coincides with earth frame, the aircraft is adjusted in attitude such that an acceleration $a_z$ sensed for the Z axis is set substantially equal to a gravity vector g, and the accelerations sensed in the X axis, $a_x$ and in the Y axis, $a_y$, are set substantially to zero. When these conditions are sensed and stabilized, the aircraft 10 is considered leveled.

Figure 2:
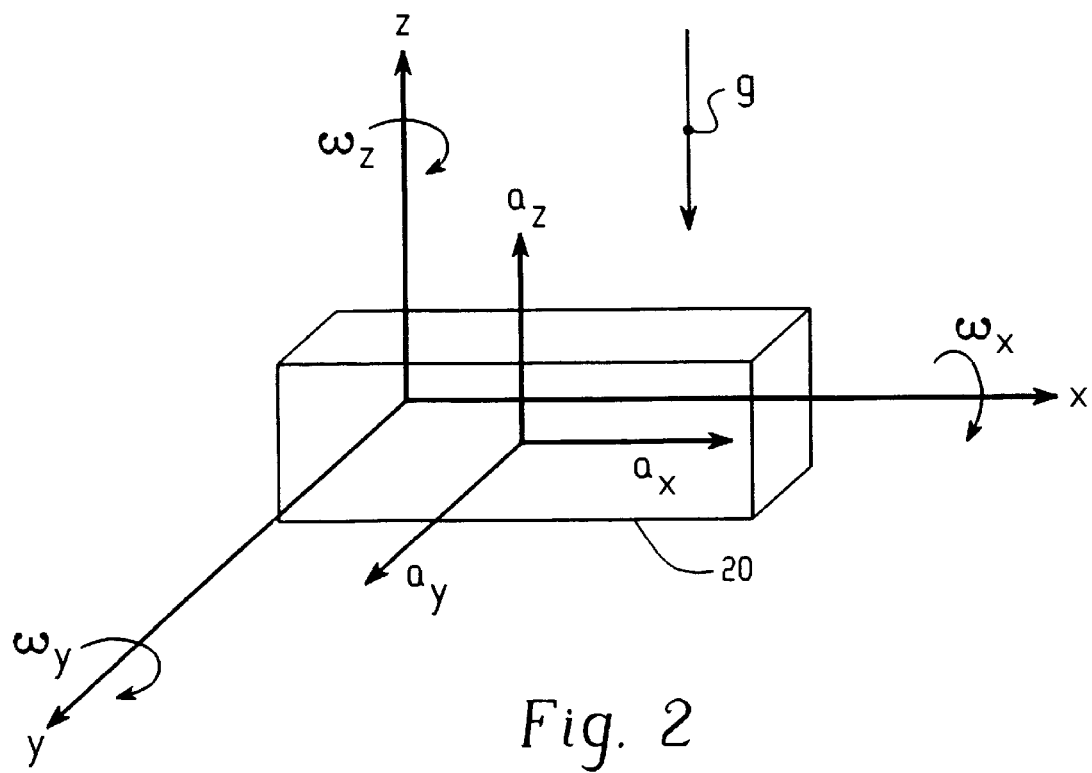
FIG. 2 is an illustration of an attitude determining device including conventional internal acceleration and rate sensors for three orthogonal axes X, Y and Z.

FIG. 2 is an illustration of an attitude determining device 20 which may include conventional internal acceleration sensors for the three orthogonal axes X, Y and Z, and may also include conventional rate sensors to measure the rotational motion $\omega_x$, $\omega_y$, and $\omega_z$ which are the rotational motions about the respective axes X, Y and Z. An example of such a device is an inertial reference unit manufactured by Honeywell, Inc., model no. HG2001AB02. The internal acceleration sensors (not shown) determine the gravity vector or local vertical g. Thereafter, rotational motion about the respective axes X, Y and Z is sensed by the rate sensors (also not shown), the output of which being integrated over time to maintain a real time craft attitude. Any accumulated integration errors may be removed during static periods by re-aligning the derived output of the device to the local vertical g which procedure is referred to as leveling or erection. These calculations are conventionally performed by a processor internal to the device which samples the sensor outputs and performs the initial and continuous algorithms to produce an attitude solution to be used for display in the aircraft or for a guidance and/or control application for the aircraft.

The attitude determining device 20 may be of a strap down system which is mechanically mounted to the case of the device or a gimballed instrument having elements which are free to rotate in inertial space independent of the case of the unit. In either case, in locating the attitude determining device 20 on board a moving craft, like an aircraft, for example, it may be installed at an unknown orientation with respect to the reference coordinate system of the craft which in the present embodiment are the three orthogonal axes X, Y and Z. It is desired that the device be mounted level with the lateral and longitudinal axes of the craft and aligned with the longitudinal X axis such as shown in FIG. 2, but this may not always be possible due to errors in mechanical leveling or adjusting of the orientation and due to errors in manufacturing tolerances of the device and the aircraft structure where the device is being mounted. This is especially evident when the attitude determining device 20 is mounted on a panel in the cockpit of the aircraft 10 much as illustrated in the sketch of FIG. 3.

Figure 3:
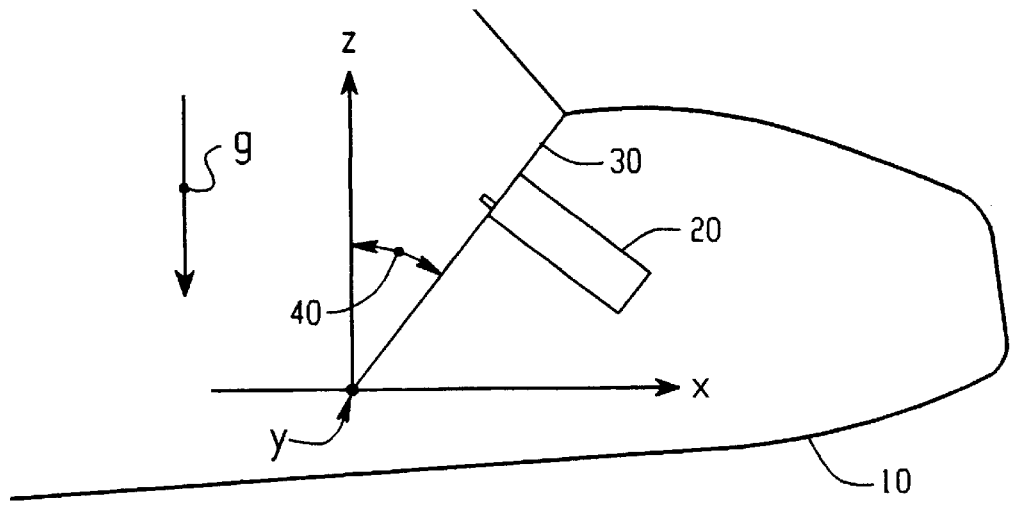
FIG. 3 is a sketch of an attitude determining device mounted on a panel in the cockpit of an aircraft at an unknown orientation to the reference coordinate system of the craft.

Referring to FIG. 3, when the attitude determining device 20 is installed on an aircraft instrument panel 30, the device may not be aligned with the "waterline" or level line of the aircraft in order to compute accurate attitude information. This is because the panel is often not perpendicular to the waterline and it is not possible in most cases to exactly compensate mechanically for the panel angle offset 40 to the vertical or Z axis. In accordance with the present invention, a method is described below which ensures an accurate calculation of the attitude of a moving craft, like an aircraft, for example, by measuring the installation orientation of the device 20 with respect to the reference coordinate axes of the aircraft and compensating for this orientation mathematically in a processor of the device 20.

Figure 4A:
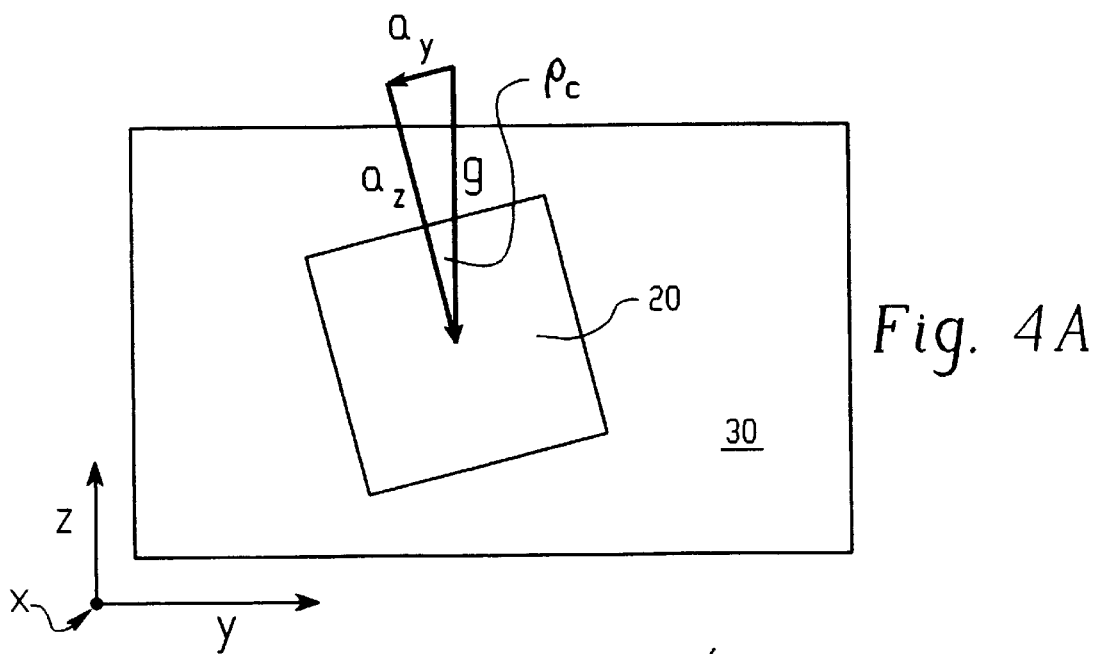
FIGS. 4A and 4B are illustrations exemplifying methods of determining the pitch and roll of the attitude determining device onboard a mobile craft using sensed acceleration measurements of the device in accordance with the present invention.

In the present embodiment, upon installation of the device 20 on the instrumentation panel 30 of the craft 10, whose reference coordinate axes have been leveled to coincide with earth frame, the installation orientation thereof is automatically measured by the installed device 20 and stored in a non-volatile memory thereof. For example, the pitch, $\phi_c$ and the roll, $\rho_c$ are measured using the acceleration sensors of the device 20 and this measurement is exemplified by the illustrations of FIGS. 4A and 4B. In FIG. 4A, the panel 30 and mounted device 20 is shown in the plane of the axes Z and Y to describe the measurement of the roll angle $\rho_c$ of the installed device 20. In the plane of the axes Z and Y, the acceleration vectors $a_y$ and $a_z$ are added vectorially to yield the gravity vector g. The installation roll angle $\rho_c$ about the X axis is the angle between the vectors g and $a_z$ and may be determined mathematically in accordance with a trigonometric function of the ratio of $a_y$ to $a_z$.

Figure 4B:
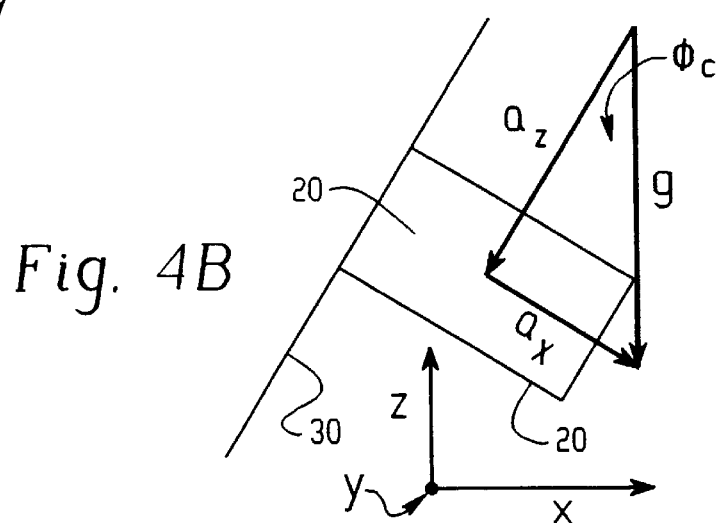

Similarly, the perspective of the device 20 installed on the panel 30 in the plane of the axes X and Z is shown in FIG. 4B. Referring to FIG. 4B, in this perspective, the acceleration vectors $a_z$ and $a_x$ add up vectorially to yield the gravity vector g and the pitch angle $\phi_c$ is the angle between the vectors g and $a_z$ which is a rotation about the Y axis. The installation pitch angle $\phi_c$ may be determined mathematically in accordance with a trigonometric function of the ratio of $a_x$ to $a_z$. In the present embodiment, the trigonometric function used for determining the installed roll and pitch angles for static orientation of the device 20 is the arcsine.

Figure 5:
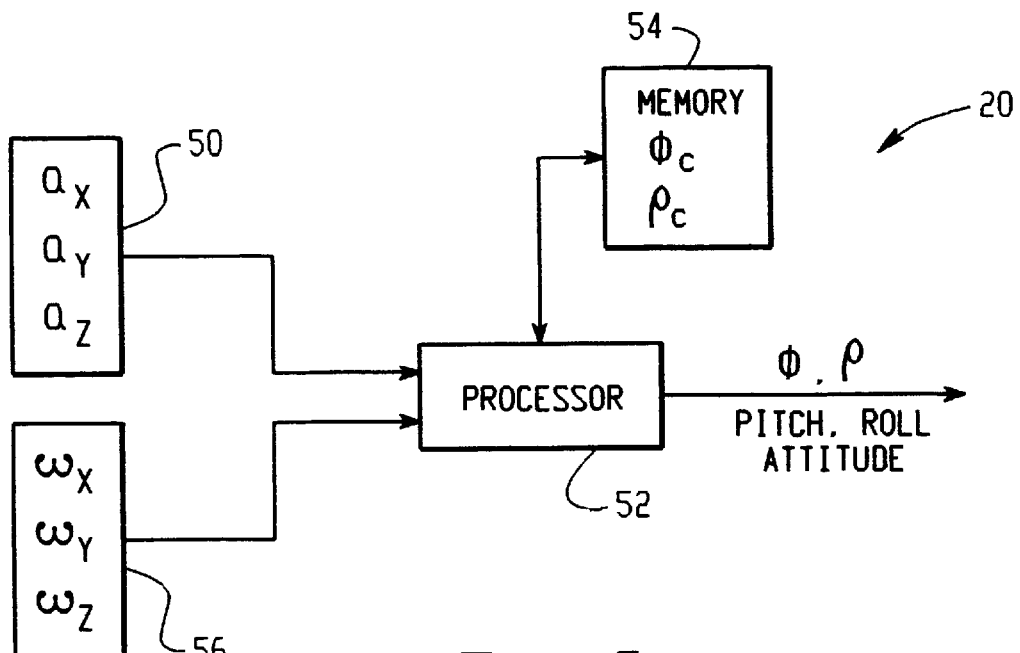
FIG. 5 is a block diagram schematic representing a suitable embodiment of an attitude determining device for performing the method in accordance with the present invention.

A block diagram schematic representing a suitable embodiment of the attitude determining device is shown in FIG. 5. Referring to FIG. 5, after the device is installed on the instrument panel of a leveled craft 10, for example, and power is subsequently activated to the device 20, an internal processor 52 of the device 20 samples the outputs of the acceleration senors depicted in the block 50 in all three axes $a_x, a_y, a_z$. The static angles of the device 20 with respect to earth frame are determined by the processor 52 from the static acceleration measurements based on the trigonometric function described above. The installation angles $\phi_c$ and $\rho_c$ are read from non-volatile memory 54 of the device 20 and the attitude of the craft 10 with respect to earth frame is determined by the processor 52 by subtracting these installation angles $\phi_c$ and $\rho_c$ from the static angles of the device 20 with respect to earth frame. Thereafter, the pitch and roll attitude angles of the moving craft 10 are computed conventionally by the processor 52 via the rate sensors $\omega_x$, $\omega_y$, $\omega_z$ which are shown at block 56 of the device 20 and received by the processor 52. In a gimballed attitude determining device the angles of the spin axis, measured using synchros or other such devices, with respect to the case are corrected by subtracting the installation angles $\phi_c$ and $\rho_c$ to yield actual aircraft pitch and roll attitude angles.

In summary, for the case in which the craft is leveled according to the description supplied above prior to sensing the installation orientation of device 20, the processor 52 samples the outputs $a_x, a_y$ and $a_z$ of the acceleration sensors 50. The static installation angles $\phi_c$ and $\rho_c$ are determined by the processor 52 from the static acceleration measurements based on the trigonometric function described above and are stored in a non-volatile memory 54 for use in compensating the attitude measurements with respect to earth frame.

Power to device 20 may then be removed. Subsequent power application to device 20 would allow a measurement of the attitude of the aircraft, i.e. orientation of the aircraft's reference coordinate axes with respect to earth frame, to be correctly determined by processor 52 using $\phi_c$ and $\rho_c$ from the memory 54.

Figure 6:
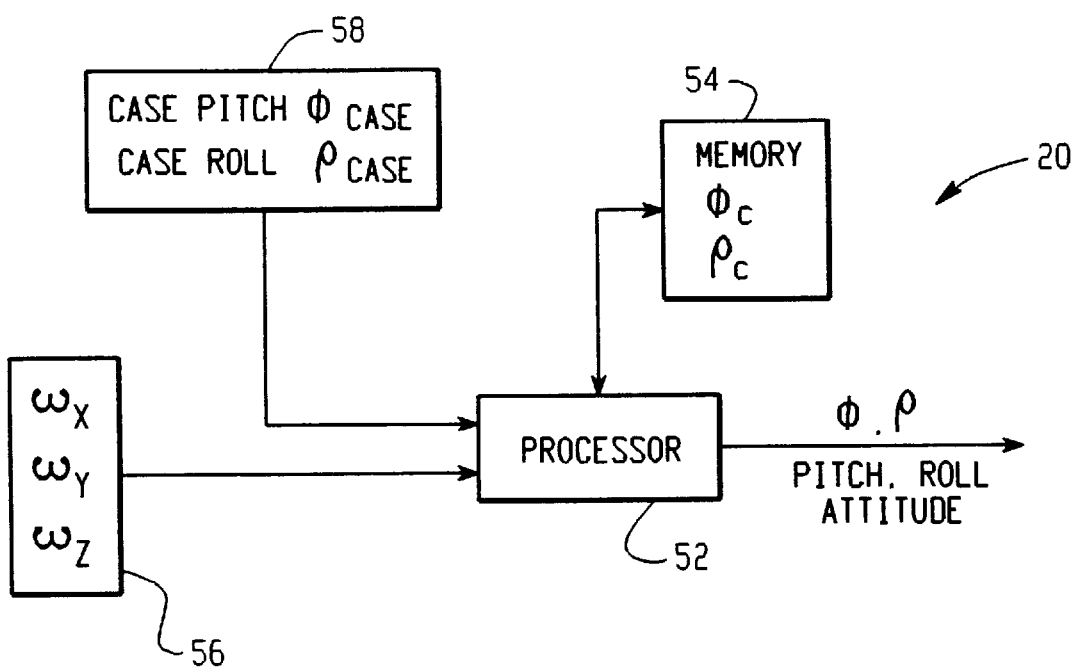
FIG. 6 is a block diagram schematic representing an alternate embodiment of an attitude determining device for performing another aspect of the present invention.

In some applications, the attitude determining device 20 may not include acceleration sensors 50 but rather include level sensors for sensing directly the pitch $\phi_{case}$ and roll $\rho_{case}$ of the installed case with respect to the earth frame. A block diagram schematic suitable for exemplifying an alternate embodiment of the device 20 including level sensors is shown in FIG. 6 with the level sensing depicted at 58. Like reference numerals are given to the other elements of the device 20 to match those described in connection with the embodiment of FIG. 5. In operation, the processor receives the installation orientation angles $\phi_{case}$ and $\rho_{case}$ measured by the level sensors at 58 and stores them in the non-volatile memory 54 as $\phi_c$ and $\rho_c$ to be accessed subsequently in compensating for the attitude angle measurements as described in connection with the embodiment of FIG. 5.

Figure 7:
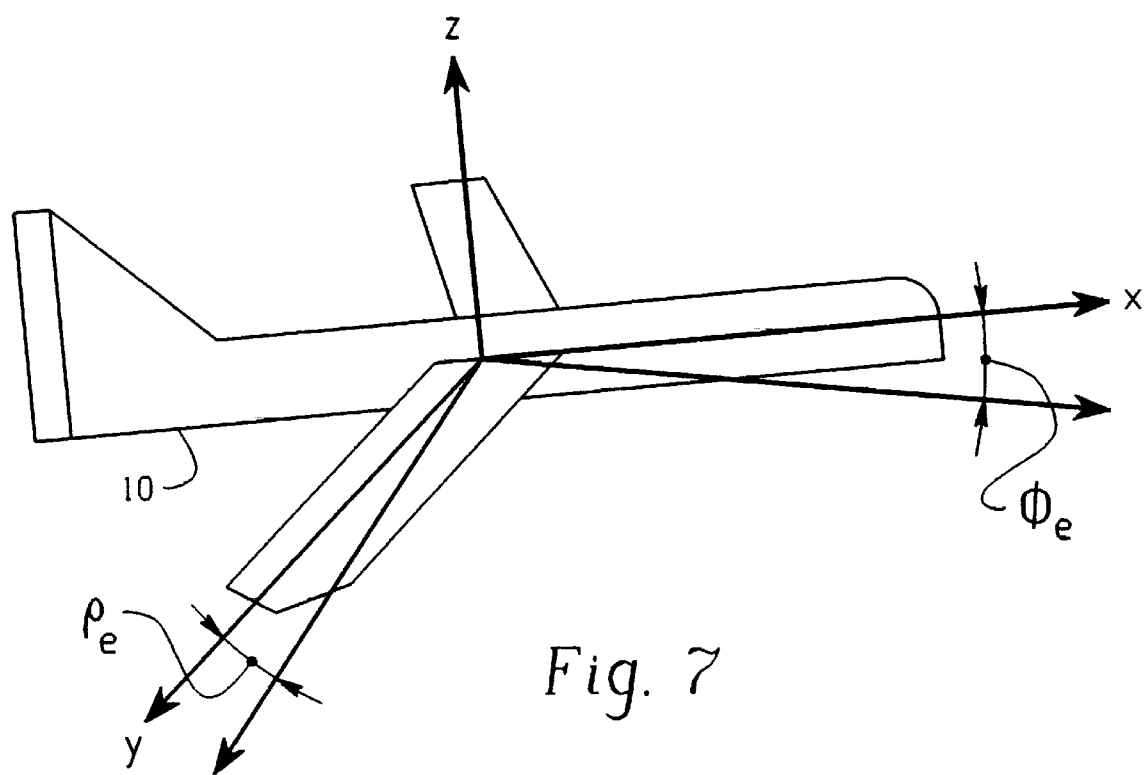
FIG. 7 is an illustration of an aircraft having its reference coordinate system unleveled with respect to an earth frame coordinate system allowing for offset angles of pitch and roll respectively from a level attitude.

The foregoing method provides for compensating for the installation orientation of the device 20 for a leveled craft. If the craft 10 is not in a level attitude as shown in the exemplified illustration of FIG. 7, the actual unlevel aircraft attitude may be measured i.e. reference coordinate axes of the aircraft with respect to earth frame, allowing the processor 52 to determine the offset angles of pitch and roll, $\phi_e$ and $\rho_e$, respectively, from a level attitude. These pitch and roll angle offsets from a level condition of the aircraft may be input either manually or electrically to the processor 52 of the device 20 as shown in FIGS. 5 and 6. In addition, the static installation angles are measured by device 20 with respect to the unleveled aircraft coordinate axes. In order for the processor 52 of device 20 to calculate the effective static installation pitch and roll angles, $\phi_c$ and $\rho_c$ of the case with respect to a level reference coordinate system of the craft 10, it may subtract the measured offset angles from their respective measured installation angles. The effective static orientation measurements of the case with respect to the craft's reference coordinate system may then be stored in the memory 54 as shown in FIGS. 5 and 6 in order to compensate for the installation orientation of the device in the craft 10 as described supra.

In attitude determining devices in which there is no non-volatile memory, the step of sensing the installation orientation of the device to obtain a static orientation measurement with respect to the reference coordinate system of the craft may be performed each time the power is turned on and the aircraft is in a static condition. The resulting static orientation measurement may be stored in the memory of the device for use in compensating for attitude measurements for the moving craft.

While the invention has been described herein in connection with a preferred embodiment, it should not be so limited, but rather construed in accordance with the breath and broad scope of the claim set appended hereto.

We claim:

1. A method of compensating for installation orientation of an attitude determining device on-board a mobile craft with respect to a reference coordinate system of said craft to obtain attitude information of said craft from said device based on an earth frame coordinate system, said method comprising the steps of:

installing said attitude determining device on-board said mobile craft at an unknown orientation with respect to said reference coordinate system of said craft;

sensing the installation orientation of said attitude determining device with respect to said earth frame coordinate system when said craft is at rest to obtain a static orientation measurement of said device;

measuring an attitude of said mobile craft with said attitude determining device; and compensating said craft attitude measurement of said device with said static orientation measurement to obtain attitude information of said craft's reference coordinate system with respect to said earth frame coordinate system.

2. The method in accordance with claim 1 wherein the reference coordinate system of said craft includes three orthogonal axes—a vertical or z axis, a longitudinal or x axis and a lateral or y axis.

3. The method in accordance with claim 2 wherein the step of sensing includes:

leveling the craft while at rest such that the z axis is aligned with a gravity vector and no substantial at rest acceleration exists at the x and y axes;

sensing the acceleration at the device for each of said three axes—a(x), a(y) and a(z) while the craft is at rest and leveled; and determining the static orientation measurement of said device based on a function of said three sensed axis accelerations—a(x), a(y) and a(z).

4. The method in accordance with claim 3 wherein the step of determining includes:

determining a static attitude pitch of the device as a trigonometric function of a ratio of the sensed accelerations a(x) and a(z); and determining a static attitude roll of the device as a trigonometric function of a ratio of the sensed accelerations a(y) and a(z); and wherein the static orientation measurement of the device comprises the determined static attitude pitch and static attitude roll.

5. The method in accordance with claim 4 wherein the step of measuring includes measuring an attitude pitch and an attitude roll of the mobile craft with said device; and the step of compensating includes compensating the measured attitude pitch with the static attitude pitch and compensating the measured attitude roll with the static attitude roll.

6. The method in accordance with claim 2 wherein the step of sensing includes:

sensing the acceleration at the device for each of said three axes—a(x), a(y) and a(z) while the craft is at rest and unleveled;

obtaining a static attitude of the craft while at rest and unleveled;

determining the static orientation measurement of said device based on said static craft attitude and a function of said three sensed axis accelerations—a(x), a(y) and a(z).

7. The method in accordance with claim 6 wherein the step of obtaining includes:

obtaining a static craft pitch and a static craft roll; and the step of determining includes:

determining a static attitude pitch of the device as a trigonometric function of a ratio of the sensed accelerations a(x) and a(z) and said static craft pitch; and determining a static attitude roll of the device as a trigonometric function of a ratio of the sensed accelerations a(y) and a(z) and said static craft roll; and wherein the static orientation measurement of the device comprises the determined static attitude pitch and static attitude roll.

8. The method in accordance with claim 7 wherein the step of measuring includes measuring an attitude pitch and an attitude roll of the mobile craft with said device; and the step of compensating includes compensating the measured attitude pitch with the static attitude pitch and compensating the measured attitude roll with the static attitude roll.

9. The method in accordance with claim 1 wherein the step of sensing includes:

leveling the craft while at rest;

sensing an installation pitch and an installation roll of the device while the craft is at rest and leveled; and wherein the static orientation measurement of the device comprises the sensed installation pitch and roll of the device.

10. The method in accordance with claim 9 wherein the step of measuring includes measuring an attitude pitch and an attitude roll of the mobile craft with said device; and the step of compensating includes compensating the measured attitude pitch with the sensed installation pitch and compensating the measured attitude roll with the sensed installation roll.

11. The method in accordance with claim 1 wherein the step of sensing includes:

sensing an installation pitch and an installation roll of the device while the craft is at rest and unleveled;

obtaining a static attitude pitch and a static attitude roll of the craft while at rest and unleveled;

determining a static attitude pitch of said device based on a combination of said static craft attitude pitch and said installation pitch and a static attitude roll of the device based on a combination of said static craft attitude roll and said installation roll;

wherein the static orientation measurement of the device comprises the determined static device attitude pitch and static device attitude roll.

12. The method in accordance with claim 11 wherein the step of measuring includes measuring an attitude pitch and an attitude roll of the mobile craft with said device; and the step of compensating includes compensating the measured attitude pitch with the static device attitude pitch and compensating the measured attitude roll with the static device attitude roll.

13. The method in accordance with claim 1 wherein the mobile craft is an aircraft, and the attitude device is installed on an instrumentation panel of said aircraft.

14. The method in accordance with claim 1 wherein the attitude determining device comprises a strapdown attitude instrument.

15. The method in accordance with claim 1 wherein the attitude determining device comprises a gimballed attitude instrument.

16. A method of compensating for installation orientation of an attitude determining device on-board a mobile craft with respect to a reference coordinate system of said craft to obtain attitude information of said craft from said device based on an earth frame coordinate system, said method comprising the steps of:

installing said attitude determining device on-board said mobile craft at an unknown orientation with respect to said reference coordinate system of said craft;

sensing the installation orientation of said attitude determining device with respect to said earth frame coordinate system when said craft is at rest to obtain a static orientation measurement of said device;

storing said static orientation measurement in a memory;

measuring an attitude of said mobile craft with said attitude determining device;

retrieving said static orientation measurement from said memory to a processor of said device; and compensating said craft attitude measurement with said retrieved static orientation measurement in said processor to obtain attitude information of said craft's reference coordinate system with respect to said earth frame coordinate system.

17. The method in accordance with claim 16 wherein the step of sensing includes:

sensing the installation orientation of the device with sensors disposed at the device;

receiving in the processor sensed orientation data of said sensors; and processing the received data in the processor to obtain the static orientation measurement of the device.

18. The method in accordance with claim 17 wherein the step of sensing includes sensing the installation orientation of the device with acceleration sensors.

19. The method in accordance with claim 17 wherein the step of sensing includes sensing the installation orientation of the device with level sensors.

20. The method in accordance with claim 16 wherein the step of compensating includes:

obtaining a static attitude of the craft while at rest and unleveled;

providing said static craft attitude to the processor of said device; and compensating said craft attitude measurement with said retrieved static orientation measurement and static craft attitude in said processor to obtain attitude information of the craft's reference coordinate system with respect to the earth frame coordinate system.

* * * * *